United States Patent
Connors

(10) Patent No.: US 6,591,076 B2
(45) Date of Patent: Jul. 8, 2003

(54) METHOD AND ARRANGEMENT FOR PROVIDING ALIGNMENT INDICIA IN A PRINTED IMAGE

(75) Inventor: Thomas W. Connors, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/941,039

(22) Filed: Aug. 28, 2001

(65) Prior Publication Data

US 2003/0044200 A1 Mar. 6, 2003

(51) Int. Cl.⁷ .................. G03G 15/36; G03G 15/00; H04N 1/387; H04N 1/393
(52) U.S. Cl. .................. 399/194; 399/82; 399/182; 399/376; 358/450; 358/451
(58) Field of Search .................. 399/6, 51, 82, 399/85, 130, 177, 182, 194, 196, 376; 358/1.1, 1.2, 448, 450, 451

(56) References Cited

U.S. PATENT DOCUMENTS

| | | | |
|---|---|---|---|
| 4,853,752 A | * 8/1989 | Takahashi et al. | |
| 5,566,005 A | * 10/1996 | Yamada | 358/451 |
| 5,600,412 A | 2/1997 | Connors | 399/81 |
| 5,742,879 A | 4/1998 | Altrieth, III | 399/139 |
| 5,794,104 A | 8/1998 | Maruyama | 399/183 |
| 5,815,786 A | * 9/1998 | Isemura | 399/376 |
| 5,987,270 A | * 11/1999 | Hulan et al. | 399/376 |
| 6,134,016 A | * 10/2000 | Watanabe et al. | 358/1.1 |

* cited by examiner

*Primary Examiner*—Sandra Brase
(74) *Attorney, Agent, or Firm*—Maginot, Moore & Bowman

(57) ABSTRACT

A method includes generating a first set of image information representative of a first portion of the multiple page image, the first set of image data corresponding to a first page of the multiple page image. The method also includes generating alignment indicia image information relating to the first portion of the multiple page image. The method further includes generating combined image information comprising the first set of image information and the alignment indicia image information.

19 Claims, 7 Drawing Sheets

METHOD AND ARRANGEMENT FOR PROVIDING ALIGNMENT INDICIA IN A PRINTED IMAGE

FIELD OF THE INVENTION

The present invention relates generally to image printing devices, and in particular, image printing devices that generate multiple page images.

BACKGROUND OF THE INVENTION

Several printing systems have operations in which a document or image is printed using several pages of paper (or other recording media). For example, documents or files generated in spreadsheet software, charting software, and other software programs may exceed the available sizes of recording media. For example, in most cases, the maximum size of available recording media is 8.5" by 14". However, many large spreadsheet files cannot, as a practical matter, be printed on a single page of such size. The printing systems divide the image into multiple printed pages. Once the multiple page image is printed out as single page components, an operator may physically combine the single page components to reconstruct the image.

Similarly, digital photocopy printing devices often include a "poster" mode of operation in which a single image may be enlarged to a size that well exceeds the size of the available recording media. To provide the oversized enlargements, the photocopier provides the image on multiple pages which may be secured together to form the enlarged image as a "poster".

Thus, regardless of whether the image generated by computer software or by raster scanning operations of a photocopier, printing devices generate multiple page images for a variety of reasons. Such multiple page images share the quality that they must be physically reconstructed into the image once the single page component portions have been printed. The exercise of constructing the multiple page image from the various single page portions of the image is somewhat similar to constructing a jigsaw puzzle.

As a result, the physical reconstruction process can be somewhat confusing, and/or inconvenient. For example, if the multiple page image has been divided into several single page portions, simply determining the appropriate arrangement can be somewhat confusing and at least inconvenient.

Such inconvenience is elevated by the use of image overlap techniques. Image overlap techniques involve the use of overlapping images on each of the single page portions of a multiple page image to allow for irregularities at the edges of a printed document. The irregularities arise from, among other things, the impracticality of printing an image exactly to the edge of the available recording medium. Accordingly, printers generate multiple page images in a manner such that each single page portion includes overlap at the borders so that the image may be reconstructed without losing any image information or introducing white space breaks in the composite image.

While the image overlap enhances the appearance of the final reconstructed multipage image, it nevertheless introduces further ambiguity into the reconstruction process. In particular, the presence of overlapping images can render the "jigsaw" puzzle reconstruction of the multiple page image more difficult.

Moreover, the presence of image overlap introduces the issue of determining the precise location at which adjacent single page portions should be combined. Because of the overlap, one cannot simply connect the adjacent pages edge to edge. Instead, congruent edge lines must be determined on both adjacent single page portions to effectuate an accurate combination. If the adjacent pages are not properly aligned, the reconstructed image can exhibit discontinuity and/or distortion.

Accordingly, there is a need for a multiple page image printing arrangement that reduces at least some of the inconveniences associated with reconstructing a multiple page image after it has been printed onto the multiple pages of recording media.

Some patents that do not address the above needs, but may relate to this disclosure include U.S. Pat. No. 5,600,412 to Connors, U.S. Pat. No. 5,742,879 to Altrieth, and U.S. Pat. No. 5,794,104 to Maruyama.

SUMMARY OF THE INVENTION

The above needs, as well as others, are fulfilled by providing a method and arrangement for generating alignment indicia image information that is appended to the image information of one or more single page portions of a multiple page image. The alignment indicia image information is printed out on the single page portion. The alignment indicia provides guidance in positioning the single page portion in relation to one or more other pages of the multiple page image. The alignment information may, but need not, be information that identifies the relative position of the page within the multiple page image and/or information that identifies the border location on the page that represents the intersection of the page with the adjacent page in the presence of image overlap. Either type, and preferably both types, of alignment information would advantageously assist a user in reconfiguring a multiple page image from the individual constituent pages.

In embodiments of the invention, a method includes generating a first set of image information representative of a first portion of the multiple page image, the first set of image data corresponding to a first page of the multiple page image. The method also includes generating alignment indicia image information relating to the first portion of the multiple page image. The method further includes generating combined image information comprising the first set of image information and the alignment indicia image information.

The alignment indicia image information can include information that when printed out shows indicia representative of the relative location of the first portion within the multiple page image and/or indicia representative of the border of the image data in the first portion to be used in the reconstructed multiple page image.

In other embodiments of the invention, an arrangement for use in a system that prints multiple page images includes an input, a processor, and a printing device. The input receives a first set of image information representative of a first portion of the multiple page image, the first set of image data corresponding to a first page of the multiple page image. The processor is coupled to the input and is operable to generate first indicia image information representative of a relative position of the first portion of the multiple page image within the composite image. The processor is further operable to generate combined image information comprising the first set of image information and the indicia image information. The printing device is operable to print the combined image information onto a first recording medium.

As a result, the assembly of the single page portions into the multiple page image is made easier and more intuitive.

Such advantage is present, in varying degree, regardless of whether the single page portions include image overlap.

The above discussed features and advantages, as well as others, may be readily ascertained by those of ordinary skill in the art by reference to the following detailed description and accompanying drawings.

DETAILED DESCRIPTION

Figure 1:
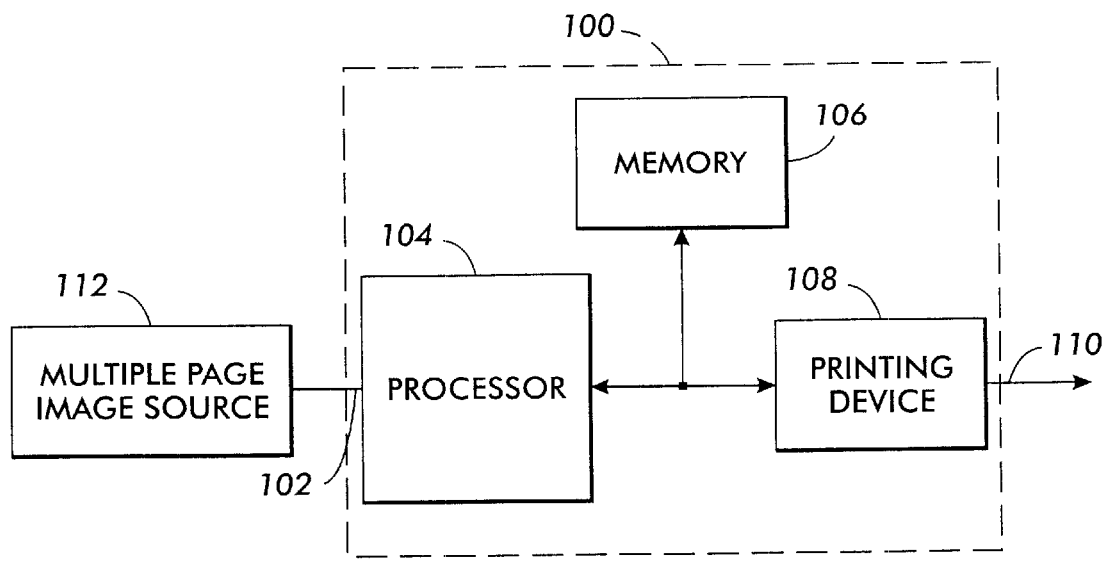
FIG. 1 shows a block diagram of an exemplary printing system that includes an arrangement according to embodiments of the subject invention.

FIG. 1 shows a system that prints multiple page images that includes an arrangement 100 according to embodiments of the present subject invention and a multiple page image source 112. As discussed above, images generated in a plurality of ways may require multiple pages of recording media to be printed out using available printing devices.

The arrangement 100 includes an input 102, a processor 104, a memory 106, a printing device 108, and an output 110. In general, the arrangement receives at the input 102 a multiple page image and generates at the output 110 multiple printed pages of recording media from which the multiple page image may be physically reconstructed.

The multiple page image source 112 can be any suitable device that generates image data corresponding to a two-dimensional image that cannot be completely printed on a single page of recording media available in the printing device 108. The multiple page image source 112 can also provide normal single page images in another mode operation that is known in the art.

It will be noted that a "multiple page image" as used herein refers to an image that is intended to be viewed as a two-dimensional whole, the entire image requiring more than one page to be adequately represented. By contrast, "multiple page image" does not merely connote a multiple page document having individually viewable pages. By way of example, a multiple page image may comprise a chart, photograph or other pictoral image that is intended to be perceived as a two-dimensional whole, and which requires multiple printed pages to be assembled to produce the entire image. It will be appreciated that a multiple page image may include text, graphical, or any other format of viewable image information.

To this end, the multiple page image source 112 can be a general purpose computer that generates printable output data, such as that generated using charting software, presentation software, computer-aided design software, and the like. In other words, the data can be generated as a software output file. Alternatively, the multiple page image source 112 can include a scanning device that obtains image information representative of an original manuscript or object. It will be appreciated that the multiple page image source 112 can in some cases be a software routine that is performed by the processor 104. However, typically, the multiple page image source 112 will be a separate device that may or may not include other processors.

Referring now to the arrangement 100 according to embodiments of the present invention, the processor 104 is a controller, microprocessor, microcontroller, programmable digital logic circuit, or other processing device, that is operable to, among other things, generate alignment indicia image information related to one or more, and preferably all of the single page portions of the multiple page image. Indicia image information is information that when printed out results in visible indicia on the recording medium. Alignment indicia image information is information that when printed out results in visible indicia that provides a user with information regarding the alignment of the single page portion with respect to one or more other single page portions of the multiple page image.

As will be discussed below in further detail, the alignment indicia that is printed out can consist of a legend or icon that shows the position of the single page portion within the multiple page image, or a margin or border indicator that indicates how to align adjacent single page portions. Other alignment indicia can alternatively be employed.

The processor 104 is further operable to generate combined image information comprising the image information from the original multiple page image and the alignment indicia image information. In particular, the processor 104 generates a final combined image that consists of the original image information and the added alignment image information. The processor 104 is operable to provide the combined image information to the printing device 108.

In a first embodiment, the processor 104 obtains the original image information from the received multiple page image. In particular, the processor 104 is configured to receive multiple page image information and allocate the multiple page image to separate single page portions. As an initial step, the processor 104 typically determines the number of single page portions, as well as the alignment of those portions that will be required to reproduce the multiple page image. To this end, the processor 104 determines the required number of pages in each row based on the number of pixels in each row of the multiple page image. Similarly, the processor 104 determines the number of pages in each column based on the number of pixels in each column of the multiple page image. As also discussed further below, the processor 104 takes into account any determined overlap areas and unused border space that should appear on page.

Once the required configuration of single page portions is determined, the processor 104 is operable to allocate the multiple page image data to each of the single page portions. Each resulting single page portion includes the pixel data used by the printer device 108 to print to a recording medium. Accordingly, the processor 104 in this embodiment is operable to translate the multiple page image information to single page portion data blocks stored in the memory 106.

Before, during, or after the transfer or translation, the processor 104 is operable to generate the alignment indicia information and inserts the indicia information into each of the single page portion data blocks such that the alignment indicia will appear in a predetermined position on the recording medium. Such predetermined position typically consists of margin area that is not a visible part of the final reconstructed multiple page image. Further detail regarding the generation of specific examples of alignment indicia information is provided further below in connection with FIGS. 5A–5D.

The processor 104 is also operable to coordinate the transfer of the single page portion data blocks from the memory 106 to the printing device 108. To this end, it will be appreciated that the processor 104 as depicted herein can include one device or several devices that perform the various processing steps described above.

The printing device 108 is a device that is operable to print the combined image information for each single page portion, for example, the single page portion data blocks with the alignment indicia information, onto a recording medium. To this end, the printing device 106 may be an ink jet printer, a laser printer, a xerographic printing device, or other printing device that is operable to print to a recording medium based on pixel data in scan line or raster format.

Figure 2:
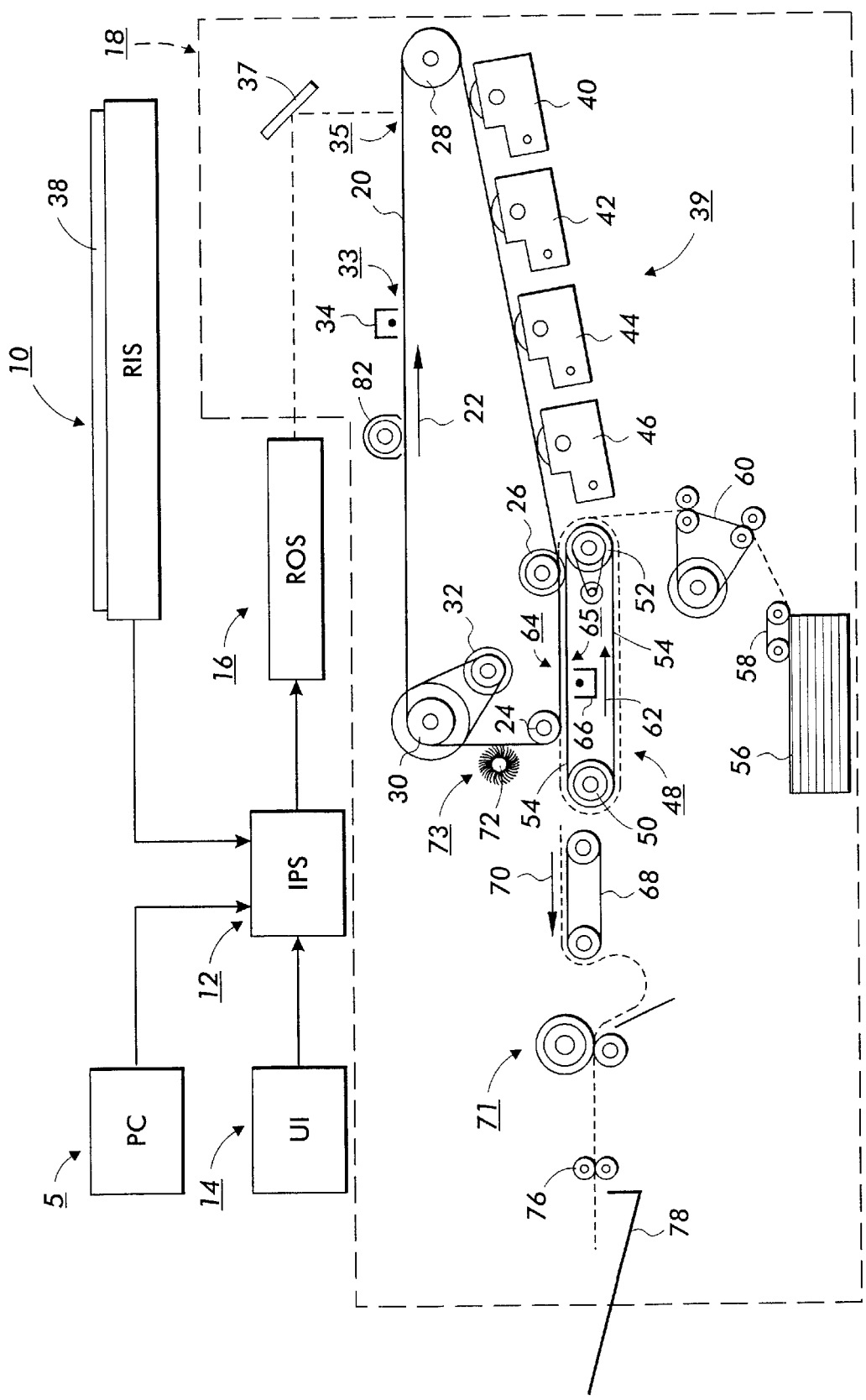
FIG. 2 shows in further detail a functional block diagram of a first embodiment of a printing system that includes an arrangement according to embodiments of the subject invention.

FIG. 2 shows an exemplary embodiment of the system of FIG. 1. FIG. 2 is a schematic elevational view showing an exemplary electrophotographic printing machine and a networked PC which may incorporate features of the present invention therein. As discussed above, however, it will become evident from the following discussion that embodiments of the subject invention is equally well suited for use in a wide variety of printing and copying systems, and therefore is not limited in application to the particular system(s) shown and described herein.

The exemplary electrophotographic printing machine of FIG. 2 is operable to generate and print on recording media multiple page images generated in a "poster mode" operation in which an input manuscript is scanned, magnified into a multiple page image, divided into single page portions with alignment indicia, and printed out page by page. The user may then reconstruct the final "poster" from the multiple printed out single page portions.

To begin by way of general explanation of the machine of FIG. 2, an image processing station (IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. Thus, for the example, the operator may use the keys of UI 14 to select "poster mode" copying as well as to dictate the final size of the poster. UI 14 may be a touch screen, or any other suitable control panel, providing an operator interface with the system. The output signal from UI 14 is transmitted to IPS 12. UI 14 may also display electronic documents on a display screen (not shown in FIG. 2).

As further shown in FIG. 2, a multiple color original document 38 may be positioned on a raster input scanner (RIS), indicated generally by the reference numeral 10. The RIS 10 contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or directly to PC 5.

Digitized electronic documents may be created, trapped, modified, stored and/or otherwise processed by PC 5 prior to transmission/relay to IPS 12 for printing on printer 18. The display of PC 5 may show electronic documents on a screen (not shown in FIG. 2). The screen of PC 5 may optionally display and interface with the IPS 12 processor(s) and controller(s), to allow enhanced user manipulation of poster mode parameters. However, it will be noted that the PC 5 need not be used to effectuate the poster mode of operation. Indeed, in the embodiment described herein, the IPS 12 includes the processor(s), controller(s), and/or other circuits (not shown in FIG. 2) required to perform the operations ascribed to the processor 104 of FIG. 1. Nevertheless, in an alternative embodiment, the operations of the processor 104 of FIG. 1 may be carried out within the PC 5.

IPS 12 also transmits signals corresponding to the desired electronic or scanned image to ROS 16, which creates the output copy image. To this end, the IPS 12 contains circuitry that embodies both the processor 104 and the memory 106 of FIG. 1. ROS 16 includes a laser with rotating polygon mirror blocks. Preferably, a nine facet polygon is used. The ROS 16 illuminates, via mirror 37, the charged portion of a photoconductive belt 20 of a printer or marking engine, indicated generally by the reference numeral 18, at a rate of about 400 pixels per inch, to achieve a set of subtractive primary latent images. The ROS 16 will expose the photoconductive belt to record three or four latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 2, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 52. A sheet gripper (not shown in FIG. 2) extends between belts 54 and moves in unison therewith. A sheet is advanced from a stack of sheets 56 disposed on a tray. A friction retard feeder 58 advances the uppermost sheet from stack 56 onto a pre-transfer transport 60. Transport 60 advances the sheet to sheet transport 48. The sheet is advanced by transport 60 in synchronism with the movement of the sheet gripper. In this way, the leading edge of the sheet arrives at a preselected position or loading zone to be received by the open sheet gripper. The sheet gripper then closes securing the sheet thereto for movement therewith in a recirculating path. The leading edge of the sheet (again, not shown in FIG. 2) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

Figure 3:
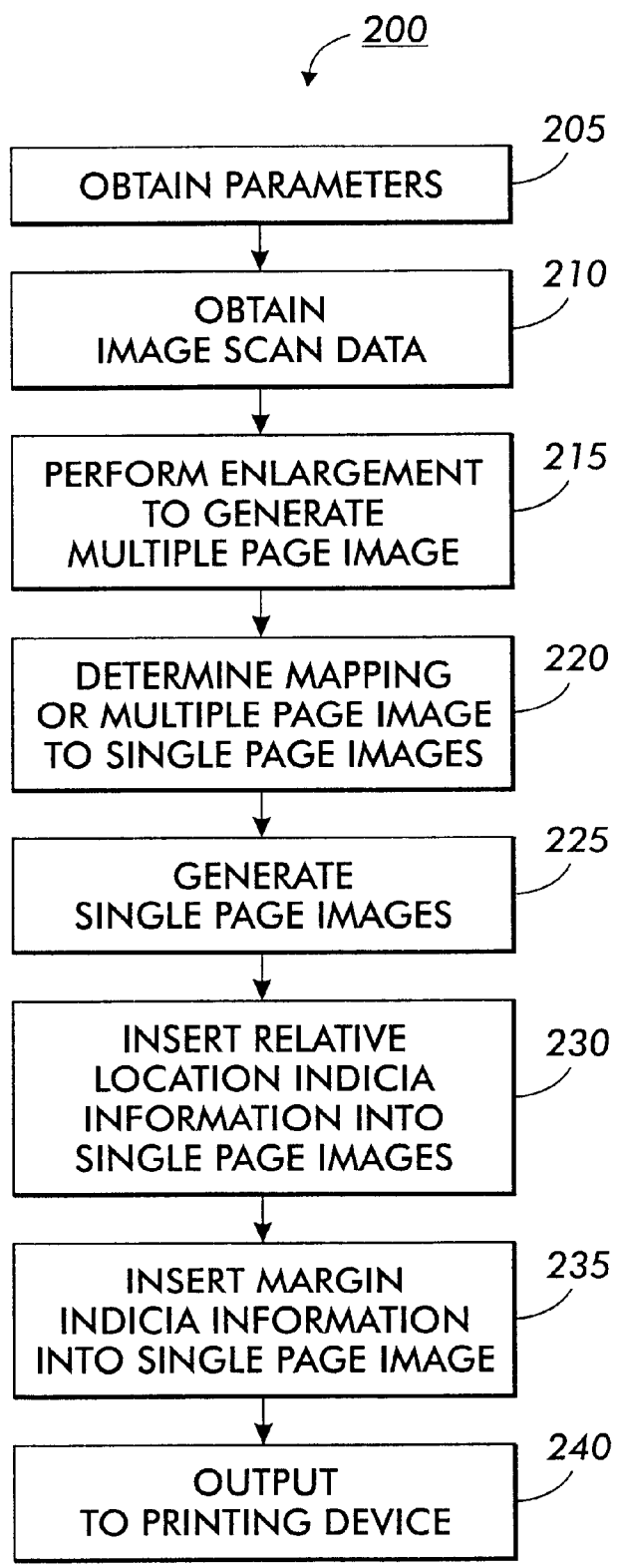
FIG. 3 shows a flow diagram of exemplary operations executed by a processor within the printing system of FIG. 2.

FIG. 3 shows a flow diagram 200 of the exemplary operations executed by the IPS 12 within the electrophotographic machine of FIG. 2 to carry out a poster mode operation in accordance with embodiments of the subject invention. An exemplary implementation of a poster mode operation is enlarging a photograph to a large format size. The large format, which may, for example, be 18" by 24", cannot be printed on normal 8.5"×11", 8.5"×14", or other common paper sizes handled by the photocopying machine of FIG. 2. Accordingly, the IPS 12 creates and generates print data as a multiple page image.

As an initial matter, in step 205, the IPS 12 receives from the UI 18 an operator command selecting poster mode as well as parameters therefor. The parameters include information that identifies the final size of the image. For example, the operator may specify the final size to be any of a plurality of sizes. Alternatively, the operator may specify a magnification factor that inherently defines the final image size. The parameters may also include the size of the recording medium to be used, for example, 8.5"×11" or 8.5"×14".

Thereafter, in step 210, the IPS 12 obtains the image scan data from the RIS 10. The IPS 12 then proceeds to execute step 215. In step 215, the IPS 12 performs the enlargement operation that generates the multiple page image in pixel data format. The multiple page image is preferably arranged in successive scan lines as is known in the art. To perform the enlargement, the IPS 12 may perform extrapolation techniques or other techniques well known in the art to expand the image expressed in a first pixel resolution to an image having a greater pixel resolution. It will be appreciated that steps 210 and 215 may be performed discretely on the entire image, such that the entire image is received into a memory, not shown, within the IPS 12 and then is translated to the multiple page image. However, the IPS 12 may alternatively perform the expansion/translation as the data is being received. Accordingly, steps 210 and 215 may be performed in an ongoing manner such that the incoming image scan data is translated or expanded into the multiple page image scan data as it is received.

In step 220, the IPS 12 determines the mapping of the multiple page image or oversize image into individual page-sized images or single page portions. In other words, the IPS 12 determines the number of single pages, as well as their configuration, that will be required to reproduce the multiple page image. To this end, the IPS determines the number of pages required in each row based on the number of pixels in each row of the multiple page image. The IPS 12 further determines the number of pages required in each column based on the number of pixels in each column.

In addition, the IPS 12 incorporates image overlap pixels in its mapping determination. In particular, each single page image preferably includes some overlap image data that is also included on the adjacent page. As discussed further above, the overlap image data helps to maintain image continuity in the reconstructed multiple page image. Without the overlap, the reconstructed image could have white space or image discontinuity. The IPS 12 makes its page mapping determination based in part on the number of image overlap pixels that will be used.

By way of example, if a multiple page image is 600 (horizontal) by 500 pixels (vertical), and each sheet nominally holds 300 (h)×200 (v) pixels, then theoretically, the configuration requirements could be 2 pages (horizontal) by 3 pages (vertical) to fit the 600 by 500 pixel image. However, if an overlap and/or border of 40 pixels is used, then the horizontal page requirement grows to 3 pages because two pages cannot hold a 600 pixel drawing that includes a 40 pixel overlap region.

It is noted that the IPS 12 may perform step 220 at any time after receiving the parameters in step 205. In any event, once the IPS 12 determines the configuration of the single page image portions, the IPS 12 in step 225 translates the multiple page image scan data into the plurality of single page image portions. As discussed above in connection with FIG. 1, the IPS 12 may suitably translate the multiple page image scan data into individual single page blocks of page files of scan data in a memory. The translation may be carried out in a plurality of ways, for example, by scanning through the multiple page scan data and storing each pixel in its corresponding mapped page file (or files in the case of overlap pixel data).

Thus, after step 225, the stored page files represent printable data, each of which will result in a portion of the multiple page image. In step 230, the IPS 12 generates and inserts the relative location indicia into a portion of each page file that contains non-viewable image data, such as the portion of the overlap image data that will ultimately be covered up. In particular, if image overlap is employed, at least some of the overlap from each page will not be viewable in the final reconstructed image because it is covered up or removed. The relative location indicia image information may be inserted into the page file such that the relative location indicia prints out in the non-viewable overlap area of the single page image. (See, e.g., FIGS. 5A–5D, discussed below). As a result, the relative location indicia can assist in reconstruction without interfering with the final reconstructed image.

The relative location indicia may take any suitable form that, when printed out, provides a visible indication of the relative location of each page within the multiple page image. One example is a relatively small depiction of all of the pages configured as they would be in the reconstructed multiple page image, with the depiction of the instant page having a different appearance from all of the other page depictions. An example of such an indication is shown as the relative location indicia 330 of FIG. 5A.

In step 235, the IPS generates border/margin indicator image data and inserts the data at the appropriate pixel location(s) of each page file. The border/margin indicator image data, when printed, provides a visible indicia identifying the border of the portion of the printed page data that is intended to be visible in the final assembled multiple page image. For example, as discussed above, at least some of the overlap data of each page is not intended to be viewable because it is redundant. The border/margin indicator identifies the border or edge of the usable (i.e. image that is intended to be used) on each page. This border/margin indicator may be used during reconstruction of the multiple page image to align the adjacent single page images accurately. To this end, for example, the border/margin indicator may appear as a broken line on each border of each page, such as the indicator 354 shown in FIG. 5A.

It will be appreciated that steps 225, 230 and 235 may be performed in any order, or even more or less contemporaneously. In the present embodiment, the result of steps 225, 230, and 235 are multiple stored page files, each page file containing a portion of the multiple page image, border/margin indicator image data that identifies (when printed) the location of the usable and unusable portions of the printed page, and relative location indicia image data.

Thereafter, in step 240, the data is provided to the ROS 16 and the printing operation is carried out as described above in connection with FIG. 2.

An exemplary operation of the flow diagram 200 may be illustrated with reference to FIGS. 4A, 4B, 4C, 4D, 5A, 5B, 5C and 5D. FIGS. 4A–4D shows various images representative of image data generated within steps 210–225 of the flow diagram 200. FIGS. 5A–5D show images representative of four single page images that may be generated in steps 230 and 235 of the flow diagram 200. Those four single page images may be reconstructed to form the multiple page image illustrated in FIG. 4B.

Figure 4A:
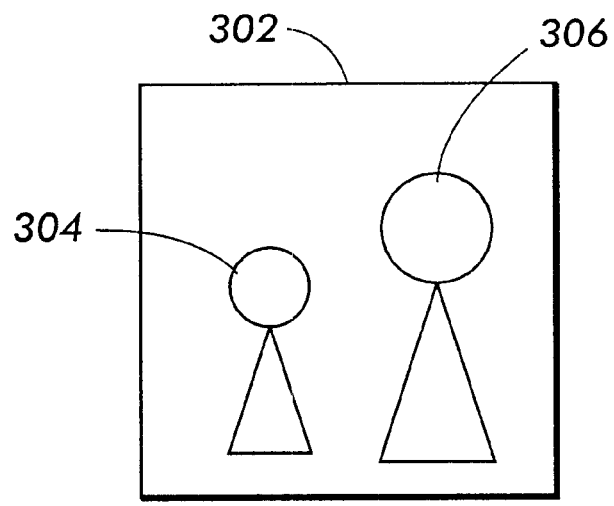
FIGS. 4A–4D and 5A–5D show an exemplary set of images that illustrate the operation of the flow diagram of FIG. 3.

With reference to FIGS. 3 and 4A, the image 302 shows the obtained image scan data received in step 210. The image 302 shows a small FIG. 304 and a large FIG. 306. The image 302 may suitably have originated as a manuscript document, such as the document 38 of FIG. 2. By way of example, the image 302 may represent a 300×200 pixel image.

Figure 4B:
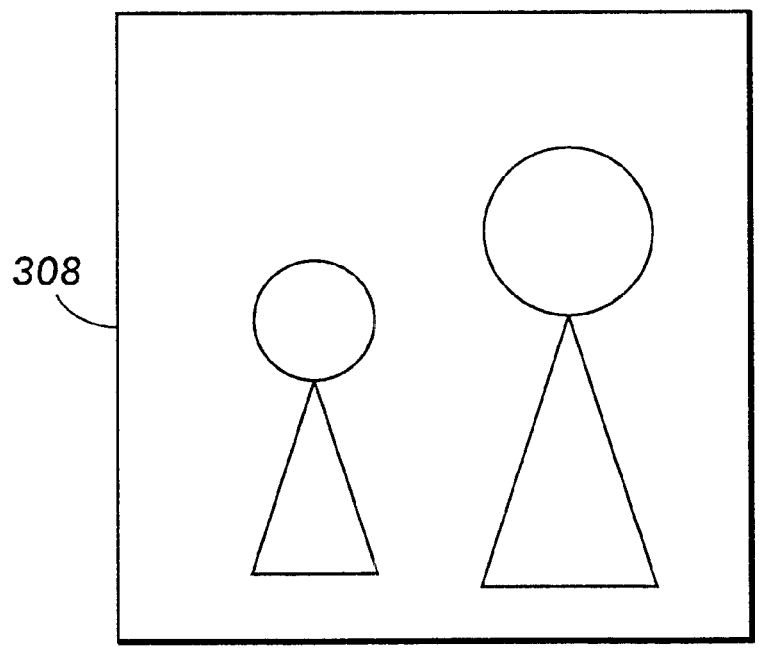

In step 215, the image 302 is enlarged to produce the multiple page image 308 of FIG. 4B. In this example, the multiple page image is a 500×333 pixel image. It is also assumed that each page has a nominal capacity of 300 pixels horizontally by 200 pixels vertically, and that each page will include 50 pixels of overlap image data along each overlapped edge. Thus, in step 220, the IPS 12 determines that the final image will require 2 pages by 2 pages of single page portions. In particular, if each page has a nominal capacity of 300 pixels horizontally, then two pages horizontally should include the entire 500 horizontal pixels of the multiple page image, even including 50 pixels of overlap. Likewise, if each page has a nominal capacity of 200 pixels vertically, then two pages vertically can include the entire 333 vertical pixels of the multiple page image, even with 50 pixels of overlap.

Figure 4C:
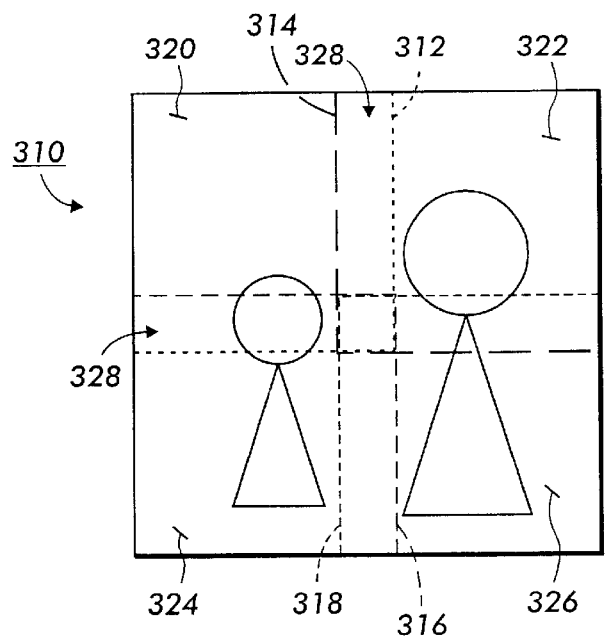
Figure 4D:
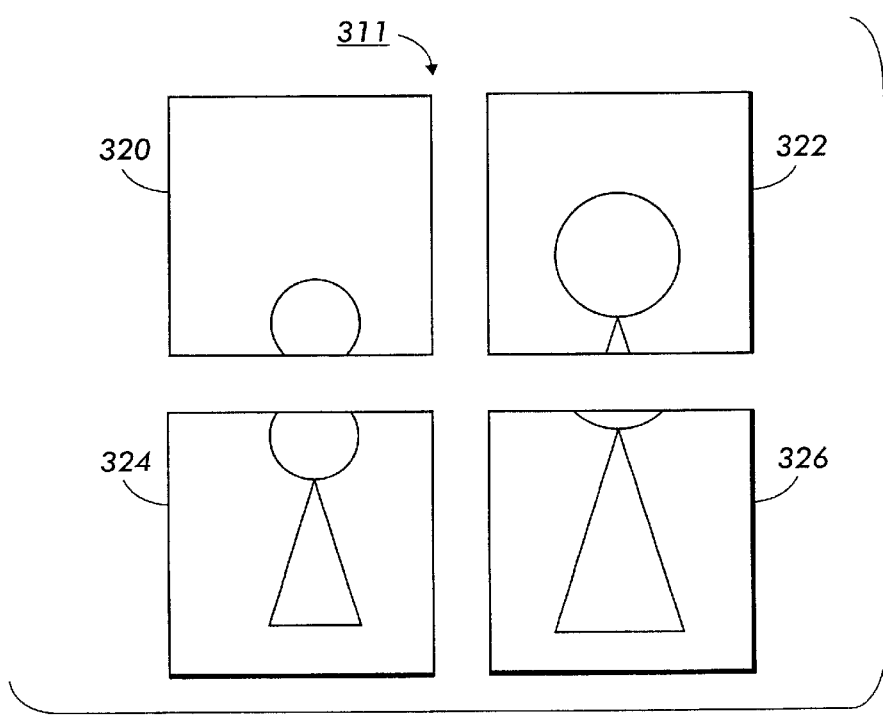

After step 220, the IPS 12 in step 225 generates the single page images 320, 322, 324 and 326 as shown in FIGS. 4C and 4D. The allocated image 310 of FIG. 4C illustrates which data is translated to each of the single page images. To this end, the allocated image 310 includes four border lines 312, 314, 316 and 318 that identify the borders of the image portion that will be allocated to each single page portion. The border line 312 shows the right edge extent and bottom edge extent of the image portion that is allocated to the first portion 320. The border line 314 shows the left edge extent and the bottom edge extent of the image portion that is allocated to the second portion 322. The border line 316 shows the right edge extent and the top edge extent of the image portion that is allocated to the third portion 324. The border line 318 shows the left edge extent and top edge extent of the image portion that is allocated to the fourth portion 326. The allocated image 310 also illustrates the overlap areas 328.

The divided image 311 of FIG. 4D illustrates the single page portions 320, 322, 324 and 326 of the multiple page image that are generated during step 225.

Figure 5A:
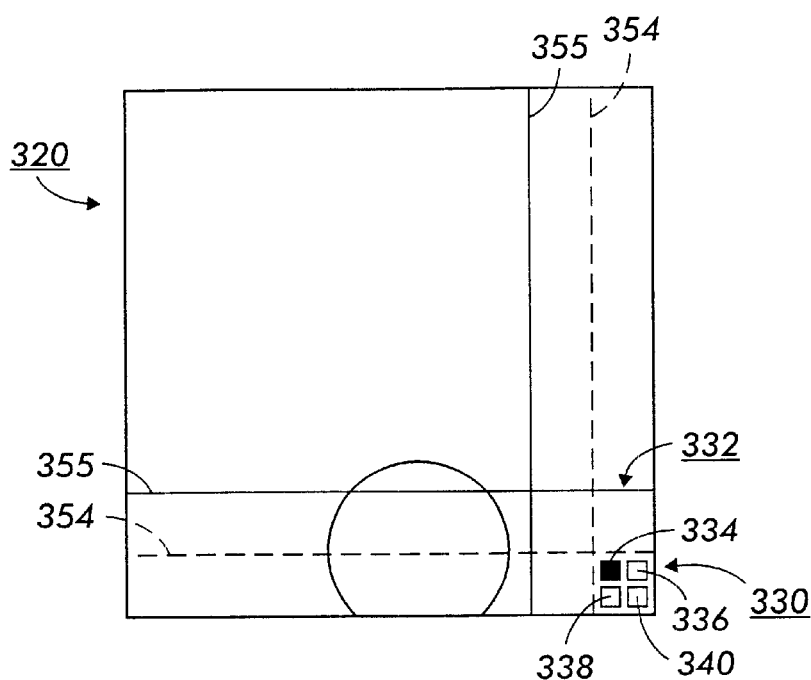

Steps 230 and 235 of the flow diagram 200 of FIG. 3 are illustrated with reference to FIGS. 5A–5D. Referring to FIG. 5A, the IPS 12 in step 230 inserts the relative location indicia image data 330 within the non-viewable overlap area 332 of the first portion 320. The relative location indicia image data 330 includes four boxes 334, 336, 338 and 340 arranged in the same 2×2 configuration as the page portions 320, 322, 324 and 326 of the multiple page image in FIG. 4D. The box 334, which has the same relative location with respect to the other boxes 336, 338 and 340 as the first portion 320 has to the other portions 322, 324 and 326 of the multiple page image, is shaded. The other boxes 336, 338 and 340 are not shaded. As a result, when the first portion 320 is printed out, the printed indicia image data 330 will signify that the first portion 320 represents the upper left hand corner of the multiple page image because the shaded box 334 is located in the upper left hand corner of the array of boxes 334, 336, 338 and 340.

Figure 5B:
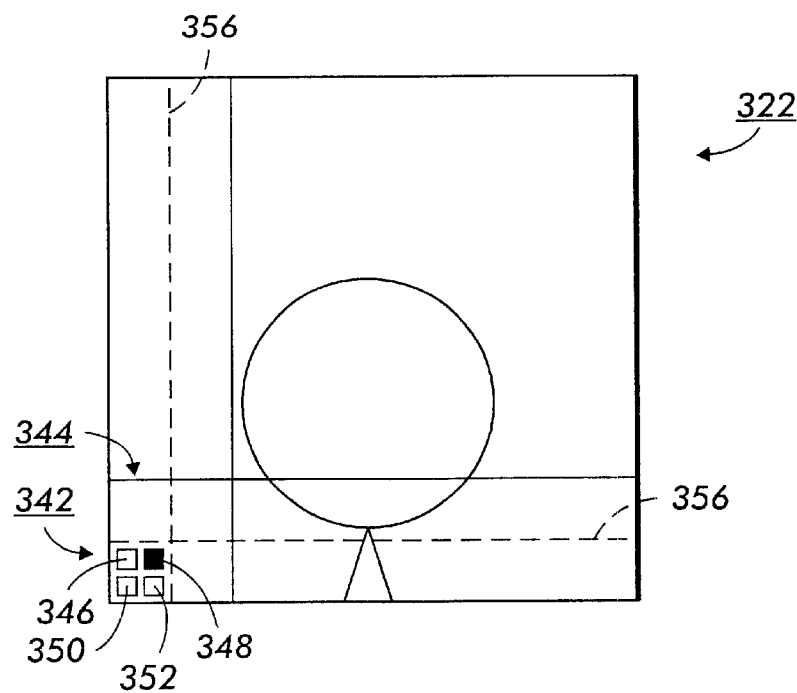

Referring to FIG. 5B, the IPS in step 230 also inserts the relative location indicia image data 342 into the non-viewable overlap area 344 of the second portion 322. The relative location indicia image data 342 also contains four boxes 346, 348, 350 and 352. However, in the indicia image data 342, the upper right hand box 348 is shaded, signifying that the second portion 322 belongs in the upper right hand corner of the multiple page image.

Figure 5C:
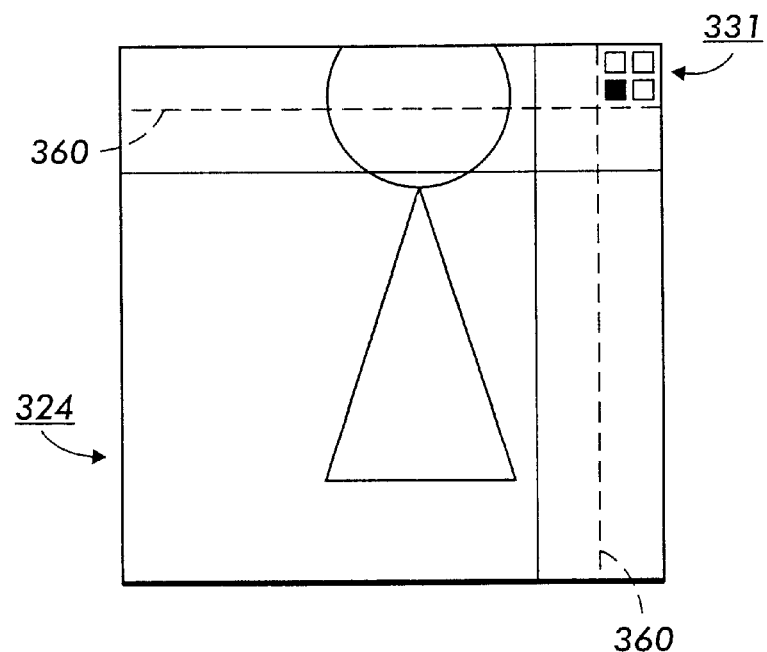
Figure 5D:
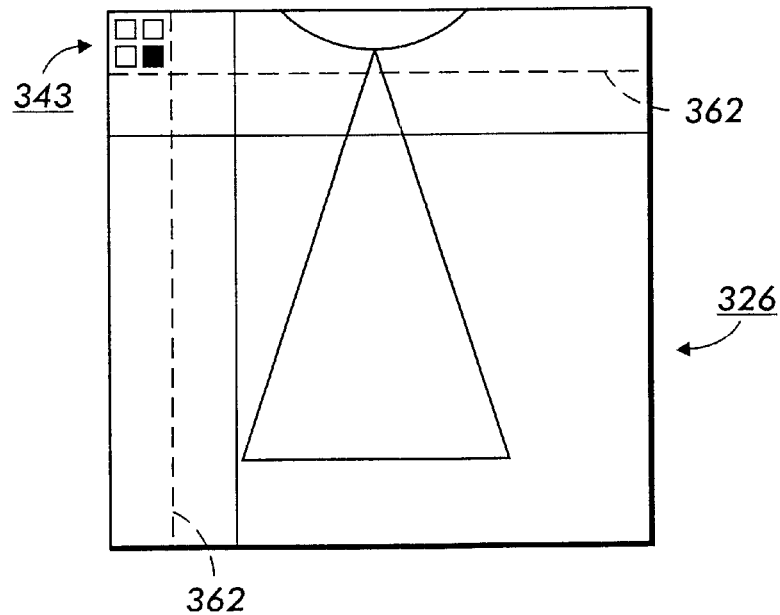

The IPS 12 repeats step 230 in an analogous manner for the other two portions 324 and 326, shown in FIGS. 5C and 5D. In particular, the IPS 12 inserts the relative location indicia image data 331 into the non-viewable area of the third portion 324 and inserts the relative location indicia image data 343 into the non-viewable area of the fourth portion 326.

Referring to FIG. 5A again, in step 235, the IPS 12 inserts overlap margin border line image data 354 into the first portion 320 at the border of its non-viewable image overlap area 332. The non-viewable overlap image area 332 roughly constitutes one-half of the overall overlap area. The entire overlap area is identified by the border line 355, which is shown only for reference purposes within FIG. 5A and would not appear in the printed image.

Referring to FIG. 5B, the IPS also inserts in step 235 overlap margin border line image data 356 into the second portion 322 at the border of its non-viewable image overlap area 344. It will be appreciated that if the first portion 320 and the second portion 322 are aligned together at the adjacent portions of their respective margin border line images 354 and 356, the portion of the multiple page image that appears on those two portions will appear continuous throughout the two pages.

Further in step 235, the IPS inserts analogous margin border line image data 360 and 362 into the third portion 324 and fourth portion 326, respectively, as shown in FIGS. 5C and 5D, respectively.

In step 240, the first portion 320 is provided to the printing device, which results in a single page document having the appearance shown in FIG. 5A. Likewise, in step 240, the second portion 322, third portion 324 and fourth portion 326 are provided to the printing device, resulting in three additional single page documents having the appearances of FIGS. 5B, 5C and 5D, respectively.

The user may then, using both types of indicia printed on the single page documents, assemble the documents to reproduce the multiple page image 308 shown in FIG. 4.

It will be appreciated that the above described embodiments are merely illustrative, and that those of ordinary skill in the art may readily devise their own implementations that incorporated the principles of the present invention and fall within the spirit and scope thereof. For example, the exact appearance of the relative location indicia may take many forms, as may the border indicator, and still benefit from many of the advantages of the present invention. Moreover, it will be appreciated that at least some of the advantages of the present invention may be obtained without having both border image indicia and relative location indicia.

What is claimed is:

1. A method comprising:
    generating a set of image information representative of a portion of the multiple page image, the set of image information corresponding to a first page of the multiple page image, the multiple page image defining a multiple page configuration that includes the first page;
    generating indicia image information representative of a relative position of the portion of the multiple page image within the multiple page image, the indicia image information including a representation of the multiple page configuration, the indicia information further including subindicia representative of the relative location of the first page in the multiple page configuration; and
    generating combined image information comprising the first set of image information and the indicia image information.

2. The method of claim 1 further comprising printing the combined image information onto a recording medium.

3. The method of claim 1 further comprising:
    generating a second set of image information representative of second portion of the multiple page image, the second set of image data corresponding to a second page of the multiple page image;
    generating second indicia image information representative of a relative position of the second portion of the multiple page image within the multiple page image; and
    generating combined image information comprising the second set of image information and the second indicia image information.

4. The method of claim 1 wherein generating the set of image information further comprises generating the set of image information, at least in part, by obtaining image information from a manuscript document.

5. The method of claim 1 wherein generating the set of image information further comprises generating the set of image information, at least in part, by obtaining image information from a software output file.

6. The method of claim 1, wherein generating indicia image information further comprises generating plural subindicia representative of each portion of the multiple page image arranged such that the relative position of each subindicia is representative of the relative position of the corresponding portion within the multiple page image.

7. The method of claim 6, wherein generating indicia image information further comprises generating the plural subindicia to include corresponding portion subindicia and non-corresponding portion subindicia, and wherein the corresponding portion subindicia has a different appearance than that of the non-corresponding portion subindicia.

8. The method of claim 1 further comprising identifying from a set of multiple page image information the set of image information.

9. An arrangement for use in a system that prints multiple page images, the arrangement comprising:

an input receiving information representative of a multiple page image;

a processor coupled to the input to receive the information, the processor executing a method of
generating a set of image information representative of a portion of a multiple page image, the set of information corresponding to a first page of the multiple page image, the multiple page image defining a multiple page configuration that includes the first page,
generating indicia image information representative of a relative position of the portion within the multiple page image, the indicia image information futher including subindicia representative of the relative location of the first page in the multiple page configuration,
generating combined image information comprising the set of image information and the indicia image information; and a printing device operable to print the combined image information onto a recording medium.

10. The arrangement of claim 9 wherein the printing device comprises an electrophotographic printing machine.

11. The arrangement of claim 9 wherein the printing device comprises an ink jet printer.

12. The arrangement of claim 9 further comprising a scanning device operably coupled to provide image information including the set of image information to the input.

13. The arrangement of claim 9 further comprising a software output file operably coupled to provide image information including the set of image information to the input.

14. The arrangement of claim 9 wherein the processor is further operable to generate plural subindicia representative of each page of the multiple page configuration arranged such that the relative position of each subindicia is representative of the relative position of the corresponding page in the multiple page configuration.

15. The arrangement of claim 14 wherein the processor is further operable to generate the plural subindicia to include corresponding portion subindicia and non-corresponding portion subindicia, and wherein the corresponding portion subindicia has a different appearance than that of the non-corresponding portion subindicia.

16. An apparatus, comprising means for generating a set of image information representative of a portion of the multiple page image, the set of image information corresponding to a first page of the multiple page image, the multiple page image defining a multiple page configuration that includes the first page;

means for generating indicia image information representative of a relative position of the portion of the multiple page image within the multiple page image, the indicia image information including a representation of the multiple page configuration, the indicia information further including subindicia representative of the relative location of the first page in the multiple page configuration; and means for generating combined image information comprising the first set of image information and the indicia image information.

17. The apparatus of claim 16 further comprising means for printing the combined image information onto a recording medium.

18. The apparatus of claim 16 further comprising:

means for generating a second set of image information representative of second portion of the multiple page image, the second set of image data corresponding to a second page of the multiple page image;

means for generating second indicia image information representative of a relative position of the second portion of the multiple page image within the multiple page image; and means for generating combined image information comprising the second set of image information and the second indicia image information.

19. The apparatus of claim 16 wherein the means for generating indicia image information further comprises means for generating plural subindicia representative of each portion of the multiple page image arranged such that the relative position of each subindicia is representative of the relative position of the corresponding portion within the multiple page image.

* * * * *